United States Patent
Yajima et al.

(10) Patent No.: US 9,497,077 B2
(45) Date of Patent: Nov. 15, 2016

(54) APPARATUS FOR PERFORMING LOOP-FREE TRANSMISSION IN A COMMUNICATION NETWORK

(71) Applicant: FUJITSU LIMITED, Kawasaki-shi, Kanagawa (JP)

(72) Inventors: Kenichi Yajima, Kawasaki (JP); Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 223 days.

(21) Appl. No.: 13/833,215

(22) Filed: Mar. 15, 2013

(65) Prior Publication Data

US 2013/0301440 A1    Nov. 14, 2013

(30) Foreign Application Priority Data

May 14, 2012    (JP) ................................. 2012-110322

(51) Int. Cl.
*H04L 12/24*    (2006.01)
*H04L 12/823*    (2013.01)
*H04L 12/26*    (2006.01)
*H04L 12/753*    (2013.01)

(52) U.S. Cl.
CPC ....... *H04L 41/0803* (2013.01); *H04L 43/0811* (2013.01); *H04L 47/32* (2013.01); *H04L 45/48* (2013.01)

(58) Field of Classification Search
CPC ................ H04L 43/0811; H04L 47/32; H04L 41/0803; H04L 45/48
USPC .......................... 370/216, 252, 254, 256, 312
See application file for complete search history.

(56) References Cited

U.S. PATENT DOCUMENTS

2002/0159398 A1    10/2002    Yamada et al.
2007/0025275 A1*    2/2007    Tallet et al. ................... 370/255

FOREIGN PATENT DOCUMENTS

JP    2002-330152    11/2002

OTHER PUBLICATIONS

IEEE Std 802.1D, IEEE Standard for Local and Metropolitan Area Networks: Media Access Control (MAC) Bridges, Jun. 9, 2004, pp. i-ix and pp. 1-269.

* cited by examiner

*Primary Examiner* — Ricky Ngo
*Assistant Examiner* — Richard Chang
(74) *Attorney, Agent, or Firm* — Staas & Halsey LLP

(57) ABSTRACT

There is provided an apparatus for performing loop-free transmission in a communication network. The apparatus includes a plurality of ports, a controller, a memory, and an interface unit. The controller generates monitoring frames that are transmitted to another apparatus, so as to monitor a connection state of the communication network. The memory includes port-state information that stores a port state in association with each of the plurality of ports. The interface unit processes a frame based on the port-state information and sets, in the port-state information, a stopped state to a first port included in the plurality of ports, in accordance with a time period during which the monitoring frames are not generated. The interface unit discards a frame received via the first port for which the stopped state is set in the port-state information.

8 Claims, 12 Drawing Sheets

FIG. 4A

| MAC DA (6) | MAC SA (6) | E-TYPE (2) | PDU (VARIABLE LENGTH) | FCS (4) |

FIG. 4B

| MAC DA (6) | MAC SA (6) | TPID (2) | VLAN ID (2) | E-TYPE (2) | PDU (VARIABLE LENGTH) | FCS (4) |

FIG. 5

| DA (6) | SA (6) | DSAP (1) | SSAP (1) | BPDU |
|---|---|---|---|---|

| OCTET | BPDU |
|---|---|
| 2 | PROTOCOL ID |
| 1 | VERSION |
| 1 | BPDU MESSAGE TYPE |
| 1 | TCA \| Don't Care \| TC |
| 8 | ROOT ID |
| 4 | ROOT PATH COST |
| 8 | BRIDGE ID |
| 2 | PORT ID |
| 2 | MESSAGE AGE |
| 2 | MAXIMUM AGE |
| 2 | HELLO TIME |
| 2 | FORWARD DELAY |

FIG. 7

| SEARCH KEY INFORMATION || V | ELAN | STP | DESTINATION |
| PORT | CONTROL INFORMATION | | | | |
| --- | --- | --- | --- | --- | --- |
| P1 | DA1 + SA2 | 1 | 1 | 1 | — |
| | DA4 + SA3 | 1 | 1 | 0 | — |
| | DA5 + SA7 | 1 | 0 | 0 | XXXX |
| | ⋮ | | | | |
| P2 | DA23 + SA8 | 1 | 1 | 1 | — |
| | DA15 + SA13 | 1 | 1 | 0 | — |
| | ⋮ | | | | |
| ⋮ | | | | | |
| Pn | DA6 + SA9 | 0 | — | — | — |
| | ⋮ | | | | |

FIG. 8A

| PORT NUMBER | STATE OF PORT |
|---|---|
| P1 | FORWARDING |
| P2 | FORWARDING |
| ⋮ | |
| Pn | BLOCKING |

FIG. 8B

| PORT NUMBER | STATE OF PORT |
|---|---|
| P1 | DISABLE |
| P2 | DISABLE |
| ⋮ | |
| Pn | DISABLE |

FIG. 10

| PORT NUMBER | STATE OF PORT | DISCARDING FLAG |
|---|---|---|
| P1 | FORWARDING | 1 |
| P2 | FORWARDING | 0 |
| ⋮ | | |
| Pn | BLOCKING | 1 |

…

APPARATUS FOR PERFORMING LOOP-FREE TRANSMISSION IN A COMMUNICATION NETWORK

CROSS-REFERENCE TO RELATED APPLICATION

This application is based upon and claims the benefit of priority of the prior Japanese Patent Application No. 2012-110322, filed on May 14, 2012, the entire contents of which are incorporated herein by reference.

FIELD

The embodiments discussed herein are related to apparatus for performing loop-free transmission in a communication network.

BACKGROUND

When a failure occurs in a communication network, communication may not be executed. In order to avoid this problem, the communication network is designed to be redundant. In the communication network, when a failure occurs in a certain path, traffic on the certain path is transmitted through another path.

In a redundant network, one or more loops are formed. In the network that has the one or more loops, when a broadcast frame or a multicast frame is transmitted, multiplexing called a broadcast storm occurs. As a result, communication resources are wastefully used. In the worst case, the network may be down.

As one of methods for improving the reliability while avoiding a loop on the network, the Spanning Tree Protocol (STP) is known. The Spanning Tree Protocol is a standard protocol defined in the IEEE802.1D recommendation. According to the Spanning Tree Protocol, when a loop is detected on a network, an adverse effect caused by the loop may be avoided by causing a port of a communication device to logically block traffic. According to the Spanning Tree Protocol, communication devices may detect a connection state of the network by transmitting and receiving bridge protocol data unit (BPDU) frames between the communication devices.

FIGS. 1A and 1B are diagrams describing the Spanning Tree Protocol. In examples of FIGS. 1A and 1B, communication devices 200A to 200C are connected to each other in a mesh form. IDs are provided to the communication devices 200A to 200C, respectively.

Each of the communication devices 200A to 200C periodically transmits a BPDU frame. The BPDU frame includes a "root ID", a "path cost" and a "bridge ID". The root ID identifies a communication device that operates as a root bridge. The path cost indicates a cost of communication to the root bridge. The bridge ID identifies a communication device that transmits the BPDU frame.

Each of the communication devices 200A to 200C may detect a connection state or topology of a network by analyzing BPDU frames received from the other adjacent communication devices. For example, the communication devices 200A to 200C may detect a loop on the network. The following description assumes that the communication device 200A is the root bridge. The root bridge is determined on the basis of the IDs provided to the communication devices 200A to 200C, for example.

In FIG. 1A, the communication device 200A transmits a BPDU frame A through ports P1 and P2. In this case, a "root ID A" and a "bridge ID A" are set in the BPDU frame A. The communication device 200B receives the BPDU frame A through a port P1. The communication device 200C receives the BPDU frame A through a port P1.

The communication device 200B transmits a BPDU frame B through a port P2. In this case, the "root ID A" and a "bridge ID B" are set in the BPDU frame B. The communication device 200C receives the BPDU frame B through a port P2.

In this case, the communication device 200C receives the BPDU frames A and B with the set "root ID A" through the plurality of ports (P1 and P2). Thus, the communication device 200C detects that a plurality of paths physically exist between the root bridge (or the communication device 200A) and the communication device 200C. In other words, the communication device 200C detects a loop.

The communication device 200C sets one of the ports P1 and P2, as a blocking port. In this case, the communication device 200C determines one of the ports P1 and P2 that is to be set as the blocking port, on the basis of the costs of the paths that extend to the root bridge from the ports P1 and P2. In this example, the port P2 is set as the blocking port. In this case, the communication device 200C logically blocks a frame received through the port P2. In addition, the communication device 200C does not transmit a frame through the port P2. As a result, the loop on the network is released. A BPDU frame, however, is not blocked by the blocking port.

As a related technique, a method for maintaining a network operation without a reconfiguration of a network upon installation of an additional device using the Spanning Tree Protocol or upon the occurrence of a failure has been proposed (for example, Japanese Laid-open Patent Publication No. 2002-330152).

IEEE Std 802.1D, IEEE Standard for Local and Metropolitan Area Network: Media Access Control (MAC) Bridge, 9 Jun. 2004 is another example of related art.

SUMMARY

According to an aspect of the invention, there is provided an apparatus for performing loop-free transmission in a communication network. The apparatus includes a plurality of ports, a controller, a memory, and an interface unit. The controller generates monitoring frames that are transmitted to another apparatus, so as to monitor a connection state of the communication network. The memory includes port-state information that stores a port state in association with each of the plurality of ports. The interface unit processes a frame based on the port-state information. The interface unit sets, in the port-state information, a stopped state to a first port included in the plurality of ports, in accordance with a time period during which the monitoring frames are not generated. The interface unit discards a first frame received via the first port for which the stopped state is set in the port-state information.

According to another aspect of the invention, there is provided an apparatus for performing loop-free transmission in a communication network. The apparatus includes a plurality of ports, a controller, a memory, and an interface unit. The controller generates monitoring frames that are transmitted to another apparatus, so as to monitor a connection state of the communication network. The memory includes discard-control information that stores information indicating whether or not a discarding process for discarding a frame is valid, in association with each of the plurality of ports. The interface unit performs the discard process that discards a first frame received via a first port for which the discard-control information stores information indicating that the discard process is valid. The interface unit controls the discard process so that the discard process is disabled for a time period during which the monitoring frames are generated by the controller and enabled for a time period during which the monitoring frames are not generated by the controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are diagrams each illustrating an example of a frame format, according to an embodiment;

FIG. 5 is a diagram illustrating an example of a format of a bridge protocol data unit (BPDU) frame;

FIG. 7 is a diagram illustrating an example of a filter table, according to an embodiment;

FIGS. 8A and 8B are diagrams each illustrating an example of a spanning tree protocol (STP) control table, according to an embodiment;

FIG. 10 is a diagram illustrating an example of an STP control table, according to a second embodiment;

DESCRIPTION OF EMBODIMENTS

As described above, a loop on a communication network may be avoided in a normal operational state by implementing the Spanning Tree Protocol in the communication devices. However, if any of the communication devices does not transmit a BPDU frame, a loop may be formed on a communication network even if the Spanning Tree Protocol is applied to the communication network.

Figure 1A:
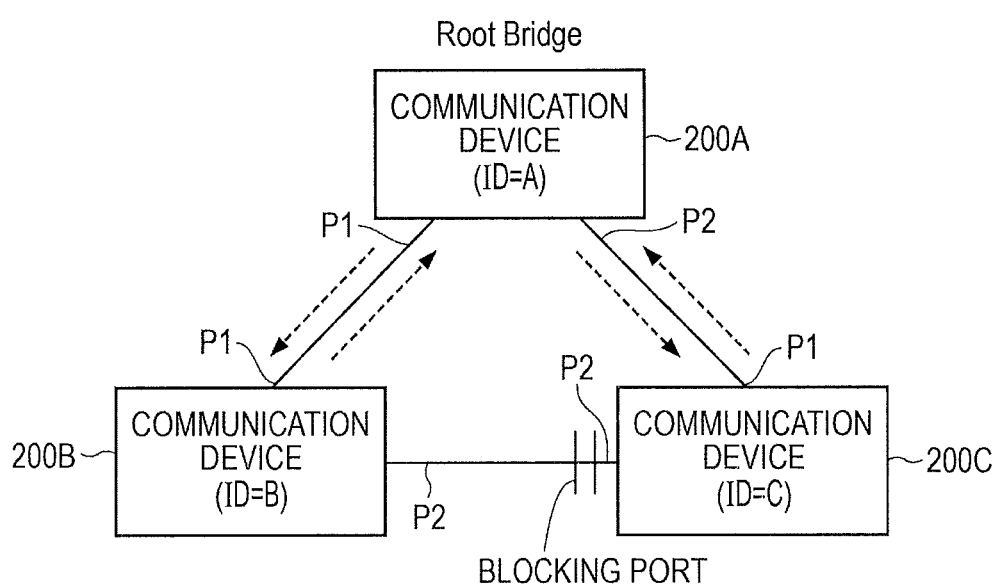
FIGS. 1A and 1B are schematic diagrams illustrating a Spanning Tree Protocol.
Figure 1B:
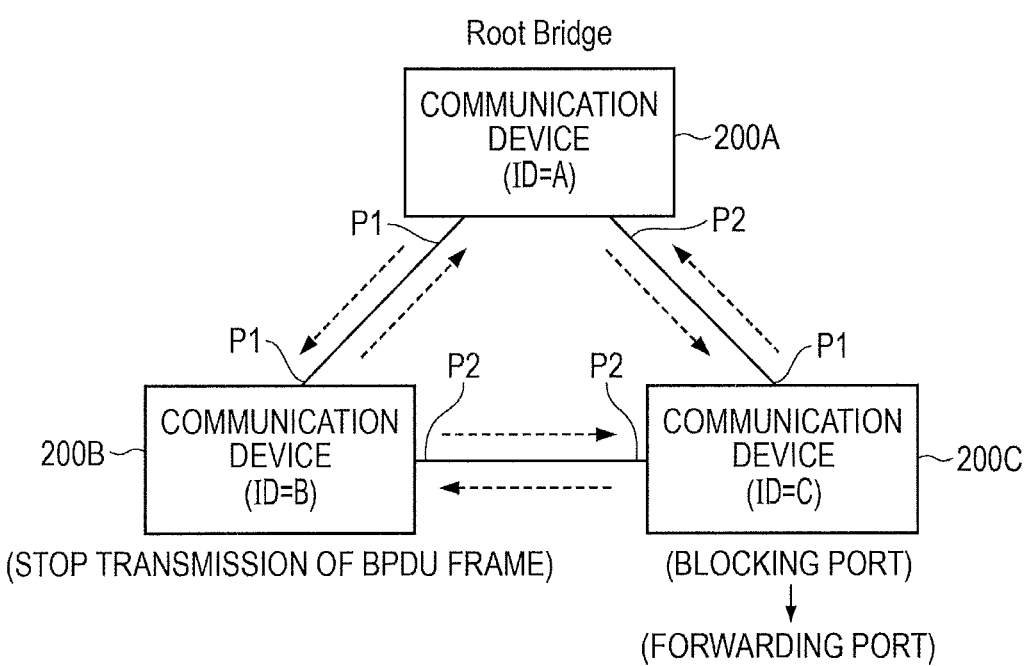

For example, as illustrated in FIG. 1B, it is assumed that the communication device 200B does not transmit a BPDU frame. This situation occurs when a function of generating a BPDU frame fails in the communication device 200B, for example. Further, the communication device 200B does not temporarily transmit a BPDU frame when software for the Spanning Tree Protocol is updated in the communication device 200B.

In this case, the communication device 200C fails to receive a BPDU frame through the port P2. Thus, the communication device 200C receives a BPDU frame with "root ID A" being set therein only through the port P1. As a result, the communication device 200C determines that a physical loop does not exist. Then, the communication device 200C changes the state of the port P2 from the blocking port to a forwarding port via which the communication device 200C able to transmit and receive a frame.

In this case, it is assumed that the communication device 200B transmits and receives frames (for example, a data frame) other than BPDU frames. The communication device 200C receives, through the port P1, a frame transmitted from the communication device 200A and receives, through the port P2, a frame transmitted from the communication device 200B. Thus, a loop is formed. As a result, when any of the communication devices 200A to 200C broadcasts or multicasts a frame, communication resources may be wastefully consumed by a broadcast storm.

Figure 2:
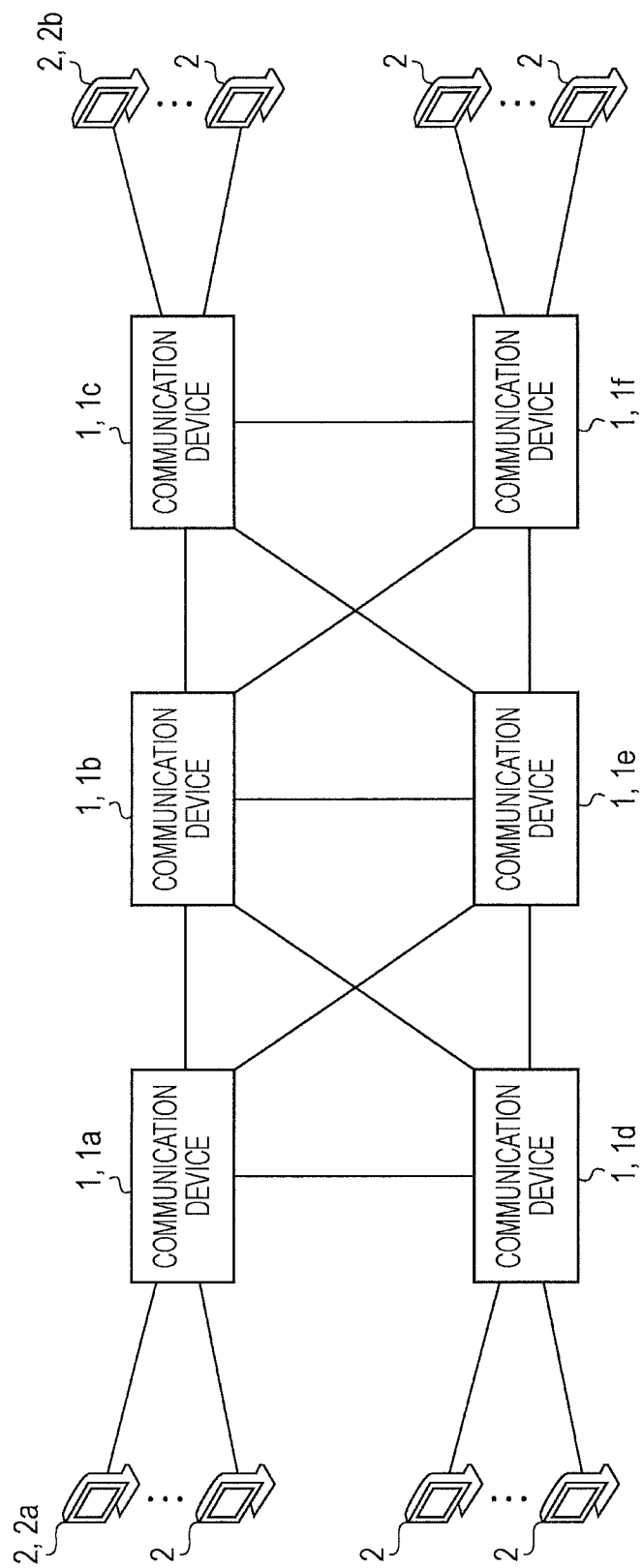
FIG. 2 is a diagram illustrating an example of a communication network including communication devices according to an embodiment.

FIG. 2 illustrates an example of a communication network using communication devices according to an embodiment. A network illustrated in FIG. 2 is configured by communication devices 1 (1a to 1f). Each of the communication devices 1 is connected to another one or more of the communication devices 1 through an optical fiber, for example. For example, the communication device 1a is connected to the communication devices 1b, 1d, and 1e, while the communication device 1b is connected to the communication devices 1a, 1c, 1d, 1e, and 1f. Each of the communication devices 1 may accommodate one or more user terminals 2. In the example of FIG. 2, each of the communication devices 1a, 1c, 1d and 1f accommodates a plurality of user terminals 2.

Each of the communication devices 1 transfers a frame received from a user terminal 2 or another one of the communication devices 1 to a destination on the basis of a destination address of the received frame. In the present specification, frames are not distinguished from packets. Thus, in the description below, it is assumed that a "frame" includes a packet.

The communication devices 1a to 1f are connected with each other so as to provide a redundant path, as illustrated in FIG. 2. For example, a plurality of paths exist between a user terminal 2a and a user terminal 2b (or between the communication device is and the communication device 1c). When the communication device 1b fails during transmission of a user frame between the user terminals 2a and 2b through the communication devices 1a, 1b and 1c, the network enables the user frame to be transmitted through the communication devices 1a, 1e and 1c.

The Spanning Tree Protocol is implemented in each of the communication devices 1. The communication devices 1 execute the Spanning Tree Protocol. The Spanning Tree Protocol may provide a network in which a loop does not logically exist.

Figure 3:
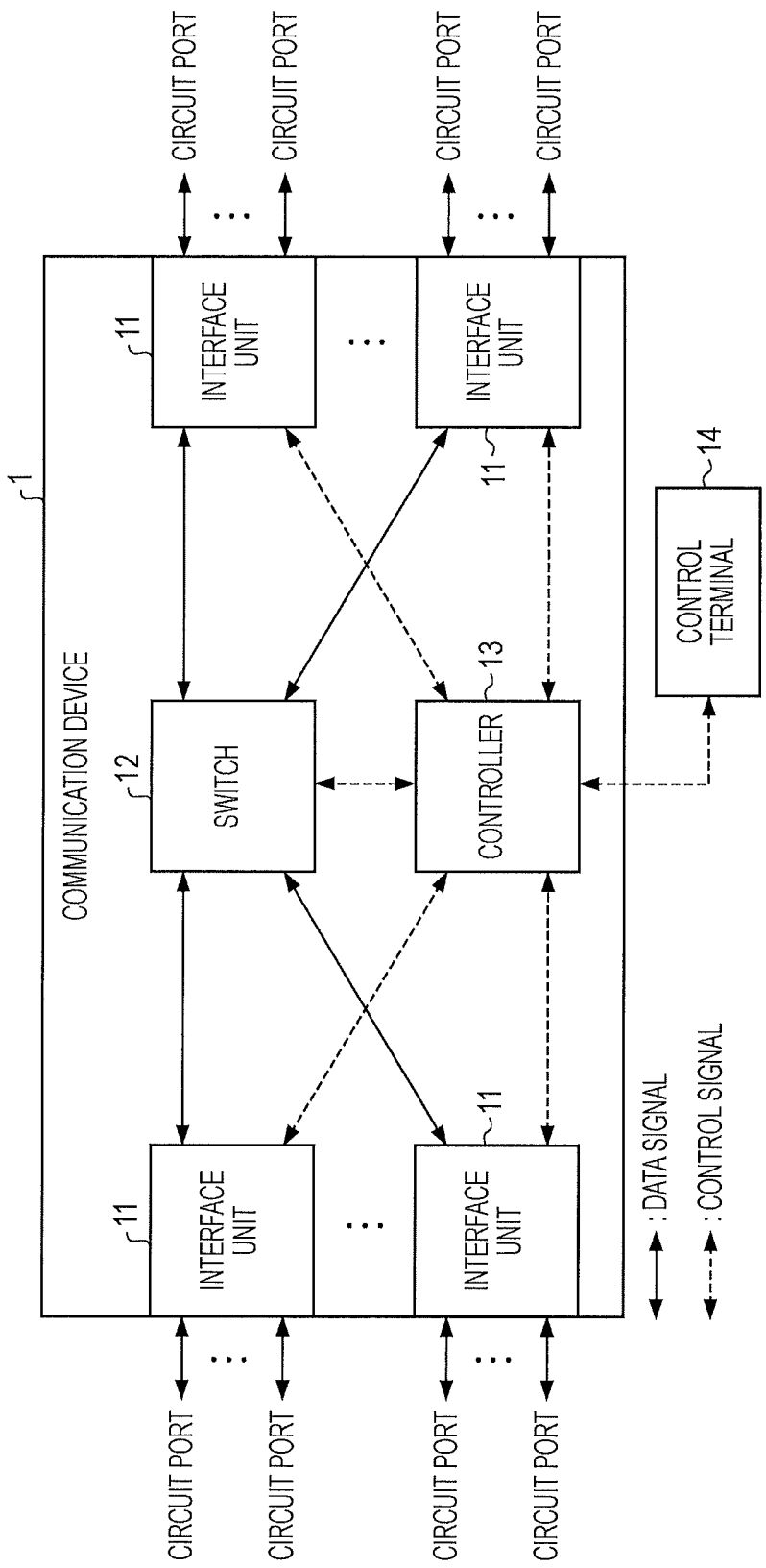
FIG. 3 is a diagram illustrating a configuration example of a communication device, according to an embodiment.

FIG. 3 illustrates a configuration example of each of the communication devices 1. The communication device 1 includes a plurality of interface units 11, a switch 12, and a controller 13, as illustrated in FIG. 3. The communication device 1 is connected to a control terminal 14.

Each of the interface units 11 has a plurality of ports. In the embodiment, the communication device 1 has a pair of an input port and an output port for each of opposing devices (another communication device 1 or a user terminal 2). The communication device 1 receives a frame from the opposing device through the input port and transmits a frame to the opposing device through the output port.

The interface units 11 each terminate a frame received via a port and sends the frame to the switch 12. The interface units 11 each output a frame received from the switch 12 through a port corresponding to a destination of the packet included in the frame. Each of the interface units 11 may be implemented using a removable module, removable a board, or a removable card, for example.

The switch 12 is connected to the plurality of interface units 11. The switch 12 forwards a frame input from an interface unit 11 to another interface unit 11 corresponding to a destination of the frame. The switch 12 may be implemented using a removable module, a removable board, or a removable card, for example.

The controller 13 includes a CPU and a memory and controls operations of the interface units 11 and an operation of the switch 12. In addition, the controller 13 interoperates with the interface units 11 so as to execute the Spanning Tree Protocol. The controller 13 may collect alarm information and/or statistical information. The controller 13 may be implemented using a removable module, a removable board, or a removable card, for example.

The control terminal 14 is a computer that is connected to the controller 13. The control terminal 14 gives an instruction of a user or network administrator to the communication device 1. The control terminal 14 may be configured as a part of the communication device 1.

The interface units 11, the switch 12 and the controller 13 not always have to be removable. For example, the interface units 11, the switch 12, and the controller 13 may be integrated with a mother board. The communication device 1 may include other elements in addition to the interface units 11, the switch 12, and the controller 13.

FIGS. 4A and 4B each illustrate an example of the format of a frame to be transmitted by the communication device 1. In the case, it is assumed that the communication device 1 transmits an Ethernet (registered trademark) frame. Numbers in parentheses in FIGS. 4A and 4B mean lengths of information in bytes.

As illustrated in FIG. 4A, the Ethernet frame includes a destination MAC address (MAC DA), a source MAC address (MAC SA), an Ethernet type (E-TYPE), a protocol data unit (PDU), and a frame check sequence (FCS). The Ethernet type identifies the type of a message stored in the protocol data unit. As an example, 0x0800 indicates an IPv4 frame. The Ethernet type is defined by IANA. The protocol data unit stores the message of an upper layer. The frame check sequence is used to detect a frame error. The frame check sequence may be implemented using a CRC32 code, for example.

FIG. 4B illustrates the format of an Ethernet frame that has a VLAN tag. A value that indicates that a virtual LAN identifier is stored in the frame is set as a tag protocol identifier (TPID). For example, 0x8100 that is defined by IEEE802.1Q is set as the tag protocol identifier. A virtual LAN identifier (VLAN ID) identifies a user. A combination of the tag protocol identifier and the virtual LAN identifier is referred to as the VLAN tag.

FIG. 5 illustrates a format of a BPDU frame. A multicast address specified in advance is set as a destination address (DA). A MAC address of a transmitting device that transmits the BPDU frame is set as a source address (SA). Values that are assigned to the Spanning Tree Protocol are set as a DSAP and an SSAP.

A BPDU message includes a root ID, a path cost, and a bridge ID as illustrated in FIG. 5. The root ID identifies a communication device that operates as a root bridge. The path cost indicates the cost of communication to the root bridge. The bridge ID identifies the communication device that transmits the BPDU frame.

First Embodiment

Figure 6:
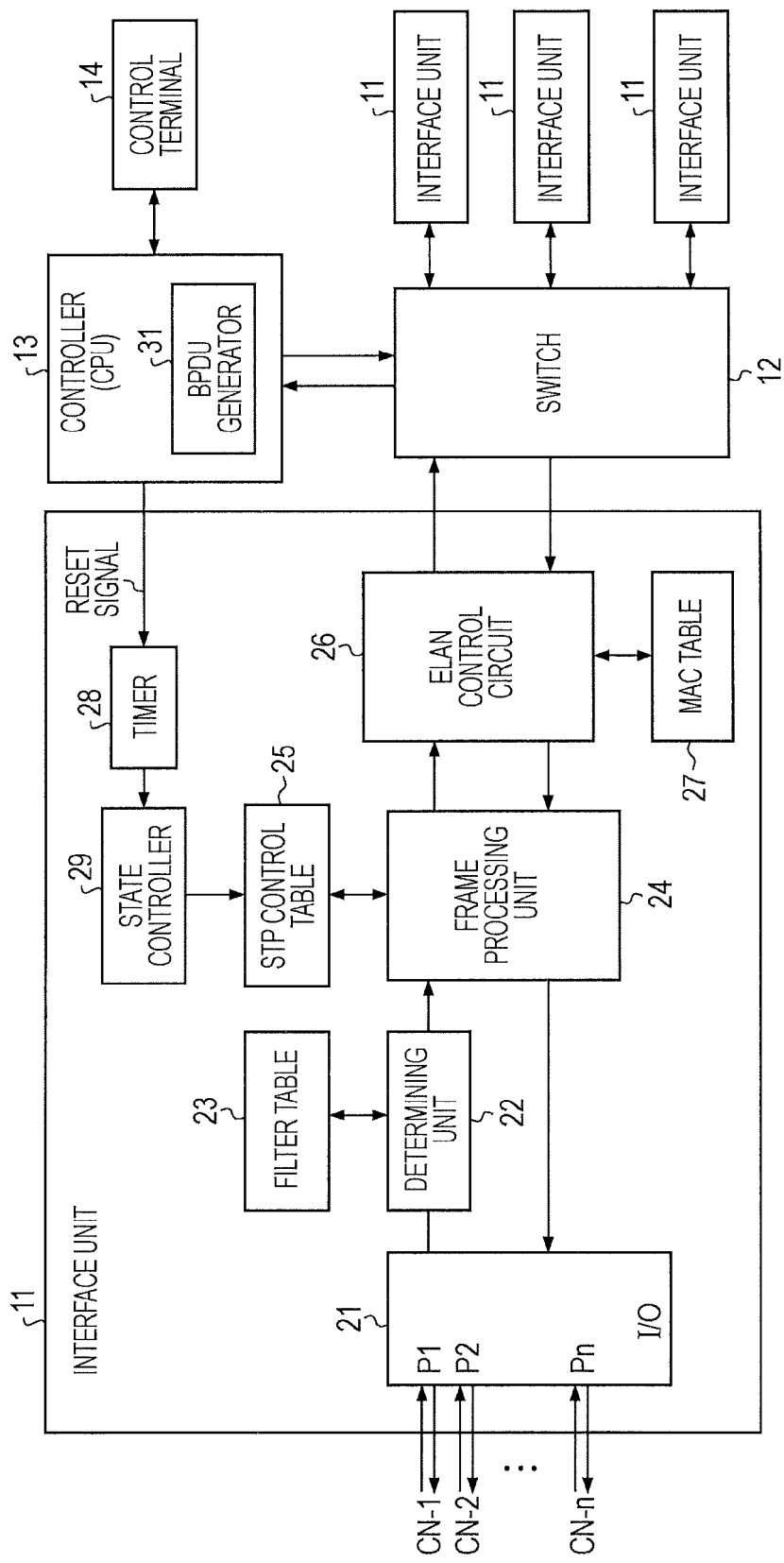
FIG. 6 is a diagram illustrating an configuration example of a communication device, according to a first embodiment.

FIG. 6 illustrates a configuration example of a communication device according to a first embodiment. In FIG. 6, the configuration and operations of each of interface units 11 are substantially the same as the other interface units 11.

The interface units 11 each include an I/O unit 21, a determining unit 22, a filter table 23, a frame processing unit 24, an STP control table 25, an ELAN control circuit 26, a MAC table 27, a timer 28, and a state controller 29. The interface units 11 may be configured to include other elements in addition to the above-mentioned elements.

The I/O unit 21 includes a plurality of ports P1 to Pn. The ports P1 to Pn are used to transmit and receive signals between the interface unit 11 and opposing devices (CNs). For example, the port P1 is used to transmit and receive a signal to and from an opposing device CN-1, while the port Pn is used to transmit and receive a signal to and from an opposing device CN-n. In the example illustrated in FIG. 2, each of the opposing devices corresponds to another communication device 1 or a user terminal 2. In the example illustrated in FIG. 2, the communication device 1b has five opposing devices (or the communication devices 1a, 1c, 1d, 1e and 1f).

The I/O unit 21 terminates signals received through the ports P1 to Pn in the physical layer and the MAC layer. Thus, the I/O unit 21 operates as a PHY/MAC processing circuit. The I/O unit 21 reproduces frames from the received signals and outputs the reproduced frames. In this case, the I/O unit 21 may output port information that identifies the ports that have received the frames. In this case, the port information indicates port numbers (P1 to Pn). The I/O unit 21 transmits a frame output from the frame processing unit 24 to an opposing device via a specified port.

The determining unit 22 determines whether or not the Spanning Tree Protocol is applied to a received frame. In this case, the determining unit 22 generates search key information from a combination of control information stored in a predetermined region of the received frame and port information of the received frame and searches the filter table 23 using the generated search key information. The port information is generated by the I/O unit 21 and identifies a port via which the frame has been received.

The control information that is used to generate the search key information is obtained by extracting, from the received frame, data that is stored in a predetermined length of area from the top of the received frame. For example, when data with a length of 12 bytes from the top of the received frame is extracted from the received frame, the destination MAC address and source MAC address of the received frame are obtained as the control information.

The control information may be one of the destination MAC address and the source MAC address. In addition, the control information may include other information in addition to the destination MAC address and the source MAC address. For example, the control information may include the virtual LAN identifier (VLAN ID) as illustrated in FIG. 4B. One or more bits of the control information may be masked. Lower bits of the destination MAC address and/or source MAC address may be masked.

The filter table 23 stores filter information that indicates whether or not the Spanning Tree Protocol is valid in association with each piece of the search key information (the combination of the control information and the port information). Thus, the determining unit 22 may search the filter table 23 using the search key information and thereby determine whether or not the Spanning Tree Protocol is applied to the received frame.

FIG. 7 illustrates an example of the filter table 23. In this example, control information that is used as search key information is destination MAC addresses and source MAC addresses. In FIG. 7, DA indicates the destination MAC addresses, and SA indicates the source MAC addresses.

The filter table 23 stores a validity flag (V), an ELAN service, flag (ELAN), an STP validity flag (STP), and destination information for the search key information. The validity flag indicates whether or not an entry is valid. For example, when the validity flag indicates 0, the entry is invalid, and when the validity flag indicates 1, the entry is valid. The ELAN service flag indicates whether or not an ELAN service is valid. For example, when the ELAN service flag indicates 0, an ELINE service is valid, and when the ELAN service flag indicates 1, an ELAN service is valid. Here, the ELINE service provides a point-to-point connection, and the ELAN service provides a multipoint-to-multipoint connection. The STP validity flag indicates whether or not the Spanning Tree Protocol is applied. For example, when the STP validity flag indicates 0, the Spanning Tree Protocol is not applied, and when the STP validity flag indicates 1, the Spanning Tree Protocol is applied. The destination information identifies a destination card and a destination port. The destination information is set for the ELINE service.

The filter table 23 is implemented, for example, using a ternary content addressable memory (TCAM). The filter table 23, however, is not limited to the TCAM and may be an SRAM in which a virtual LAN identifier is used as a search index. The details of the information stored in the filter table 23 are registered by the user or the network administrator through the control terminal 14, for example.

The determining unit 22 searches the filter table 23 using the search key information for each of frames. For example, it is assumed that a frame that has a "destination MAC address DA1" and a "source MAC address SA2" is received via the port P1. In this case, the determining unit 22 acquires, from the filter table 23, "the ELAN service flag indicating that the ELAN service is valid" and "the STP validity flag indicating that the Spanning Tree Protocol is applied". When a frame that has a "destination MAC address DA4" and a "source MAC address SA3" is received via the port P1, the determining unit 22 acquires, from the filter table 23, "the ELAN service flag indicating that the ELAN service is valid" and "STP indicating that the Spanning Tree Protocol is not applied". In this manner, the determining unit 22 acquires an ELAN service flag and an STP validity flag for each of received frames. When a search result matching a received frame is not acquired from the filter table 23a, the determining unit 22 discards the received frame.

Upon receiving a frame, the frame processing unit 24 acquires port information corresponding to the frame from the I/O unit 21 and acquires an ELAN service flag and an STP validity flag from the determining unit 22.

When the Spanning Tree Protocol is applied to the received frame, the frame processing unit 24 searches the STP control table 25 using the port information corresponding to the received frame. When the Spanning Tree Protocol is not applied to the received frame, the frame processing unit 24 does not search the STP control table 25. Further, when the ELAN service flag is invalid, the frame processing unit 24 does not search the STP control table 25.

FIG. 8A illustrates an example of the STP control table 25. The STP control table 25 stores port states for the ports P1 to Pn. In this example, as states of each of the ports P1 to Pn, a forwarding state (transfer approval state), a learning state (topology learning state), a listening state (transmission and reception stopped state), a blocking state (transfer stopped state) and a disable state (stopped state) are prepared. The STP control table 25 is configured to be updated by the Spanning Tree Protocol.

The frame processing unit 24 processes frames on the basis of the states of the ports P1 to Pn. For example, the frame processing unit 24 transfers a user frame received via a port in the forwarding state to a destination of the user frame. The frame processing unit 24 discards a user frame received via a port in the blocking state.

The ELAN control circuit 26 searches the MAC table 27 using a destination MAC address of a frame. When a destination port number corresponding to the destination MAC address has been already registered in the MAC table 27 by the learning function of the MAC table 27, the ELAN control circuit 26 transmits the frame to the port corresponding to the destination MAC address. When the destination port number is not registered for the destination MAC address, the ELAN control circuit 26 transmits the frame to all the ports P1 to Pn. In other words, when the destination MAC address has not been learned yet, flooding is executed.

Upon receiving a frame via a port of the interface unit 11 with the aforementioned configuration, the determining unit 22 determines whether or not the Spanning Tree Protocol is applied to the received frame. When the Spanning Tree Protocol is applied to the received frame, the frame processing unit 24 processes the frame on the basis of the state of the port via which the frame has been received. The frame that has passed through the frame processing unit 24 is guided to a destination port by the switch 12.

As for a frame that is input to the interface unit 11 from the switch 12, the ELAN control circuit 26 searches the MAC table 27 and determines an output port for the frame. The frame processing unit 24 processes the frame on the basis of the state of the determined output port. In parallel, the source MAC address, an interface unit 11 that has received the frame, and a port via which the frame is received are learned, and information thereof is stored in the MAC table 27.

The controller (CPU) 13 executes the Spanning Tree Protocol. For example, the controller 13 may monitor a connection state (or topology) of the network on the basis of a BPDU frame received from another communication device. Then, the controller 13 may control the states of the ports on the basis of the connection state of the network. At the same time, for example, the controller 13 updates the STP control table 25.

The controller 13 includes a BPDU generator 31. The BPDU generator 31 periodically generates a BPDU frame. For example, the BPDU generator 31 generates the BPDU frame at intervals of 2 seconds. The intervals at which the BPDU frame is generated may be changed. The communication device 1 transmits the BPDU frame generated by the BPDU generator 31 to an opposing device via each of the ports. The BPDU frame, however, is not transmitted via a port in the disable state.

When the Spanning Tree Protocol is executed by the controller 13, the BPDU generator 31 generates a reset signal at predetermined intervals. In other words, when periodically generating a BPDU frame, the BPDU generator 31 generates the reset signal at the predetermined intervals. The intervals at which the reset signal is generated may be equal to or different from the intervals at which the BPDU frame is generated.

The interface units 11 each includes a timer 28 and a state controller 29. The timer 28 measures a predetermined time interval which is hereinafter referred to as "monitoring interval". The monitoring interval is set at an interval that is longer than the intervals at which the reset signals are generated. In other words, when periodically generating the BPDU frames, the BPDU generator 31 generates the reset signals at the intervals that are shorter than the monitoring interval measured by the timer 28. When the BPDU frames are generated at intervals of 2 seconds, the monitoring interval may be set at 6 seconds, for example.

The timer 28 is reset by a reset signal. In other words, when the monitoring interval elapses without a reset signal provided to the timer 28, the timer 28 expires. In this case, the timer 28 provides an expiration signal to the state controller 29.

Upon receiving the expiration signal from the timer 28, the state controller 29 sets each of the port states stored in the STP control table 25 at the disable state. In this case, the port states are forcibly set at the disable states by the state controller 29 regardless of control by the Spanning Tree Protocol. FIG. 8B illustrates the state of the STP control table 25 when the timer 28 expires.

In the communication device 1 according to the first embodiment, when the BPDU generator 31 normally operates, the timer 28 is repeatedly reset by reset signals and does not expire. In this case, the state controller 29 does not operate, and the STP control table 25 is controlled according to the Spanning Tree Protocol.

When the controller 13 (or the BPDU generator 31) does not normally operate, a reset signal is not generated and the timer 28 expires. In this case, the port states stored in the STP control table 25 are forcibly set at the disable states by the state controller 29.

Upon receiving a frame to which the Spanning Tree Protocol is applied, the frame processing unit 24 references the STP control table 25 and determines the state of a port via which the frame has been received. Then, the frame processing unit 24 processes the received frame based on the determined state of the port.

Next, an example of an operation of the communication device 1 when the timer 28 expires is described. The timer 28 expires, for example, when the controller 13 fails, when a control program is updated by the controller 13, or when the controller 13 is removed. The expiration of the timer 28 causes the states of the ports to be set at the disable states, as illustrated in FIG. 8B.

In a first operational example, a frame A is received via the port P1. The destination MAC address and source MAC address of the frame A are DA1 and SA2, respectively.

The determining unit 22 references the filter table 23 illustrated in FIG. 7 and acquires, for the frame A, "the ELAN service flag indicating that the ELAN service is valid" and "the STP validity flag indicating that the Spanning Tree Protocol is applied". In this case, the frame processing unit 24 searches the STP control table 25 using the port number P1 and acquires "the port state indicating the disable state". Then, the frame processing unit 24 discards the frame A.

In a second operational example, a frame, B is received via the port P1. The destination MAC address and source MAC address of the frame B are DA4 and SA3, respectively.

The determining unit 22 references the filter table 23 illustrated in FIG. 7 and acquires, for the frame B, the "ELAN service flag indicating that the ELAN service is valid" and the "STP validity frag indicating that the Spanning Tree Protocol is not applied". When the Spanning Tree Protocol is not applied, the frame processing unit 24 does not search the STP control table 25. The frame processing unit 24 transfers the frame B to the ELAN control circuit 26 which guides the frame B to a destination port obtained from the MAC table 27.

In the first embodiment, when the communication device 1 fails to transmit a BPDU frame, the ports P1 to Pn are set at the disable states. Thus, the communication device 1 discards frames received from the opposing devices. Further, the communication device 1 discards frames destined for the opposing devices. Thus, formation of a loop on the network is logically avoided.

In the example illustrated in FIG. 1B, the communication device 200B fails to transmit a BPDU frame. Assume that the communication device 200B illustrated in FIG. 1B is implemented by the communication device 1 (illustrated in FIG. 6) according to the first embodiment. Based on this assumption, the communication device 1 (or the communication device 200B) stops transmission and reception of frames. Thus, the loop that may be formed by the communication devices 200A to 200C is avoided. Thus, the problem described with reference to FIG. 1B is solved.

In the first operational example, the frame A to which the Spanning Tree Protocol is applied is discarded by the frame processing unit 24. In the second operational example, the frame B to which the Spanning Tree Protocol is not applied is not discarded by the frame processing unit 24. Whether or not the Spanning Tree Protocol is applied may be determined for each of users, for each of virtual LANs, and for each of service flows. In the example illustrated in FIG. 7, whether or not the Spanning Tree Protocol is applied is set for each of combinations of destination MAC addresses and source MAC addresses. Thus, whether or not forcible frame-discarding is permitted may be determined for each of users, for each of virtual LANs, and for each of service flows.

In the aforementioned first and second operational examples, the frame processing unit 24 processes frames received via the ports P1 to Pn. However, the embodiments are not limited to this. The frame processing unit 24 may process frames that propagate from the switch 12 toward the ports P1 to Pn. In this case, however, the frame processing unit 24 discards a frame that propagates to a port for which the disable state is set in the STP control table 25.

In the first embodiment, the hardware circuit (or the timer 28) is used to detect a failure of the controller 13 or the like. Thus, with a simple configuration, a loop caused by a failure of the controller 13 may be avoid.

Second Embodiment

Figure 9:
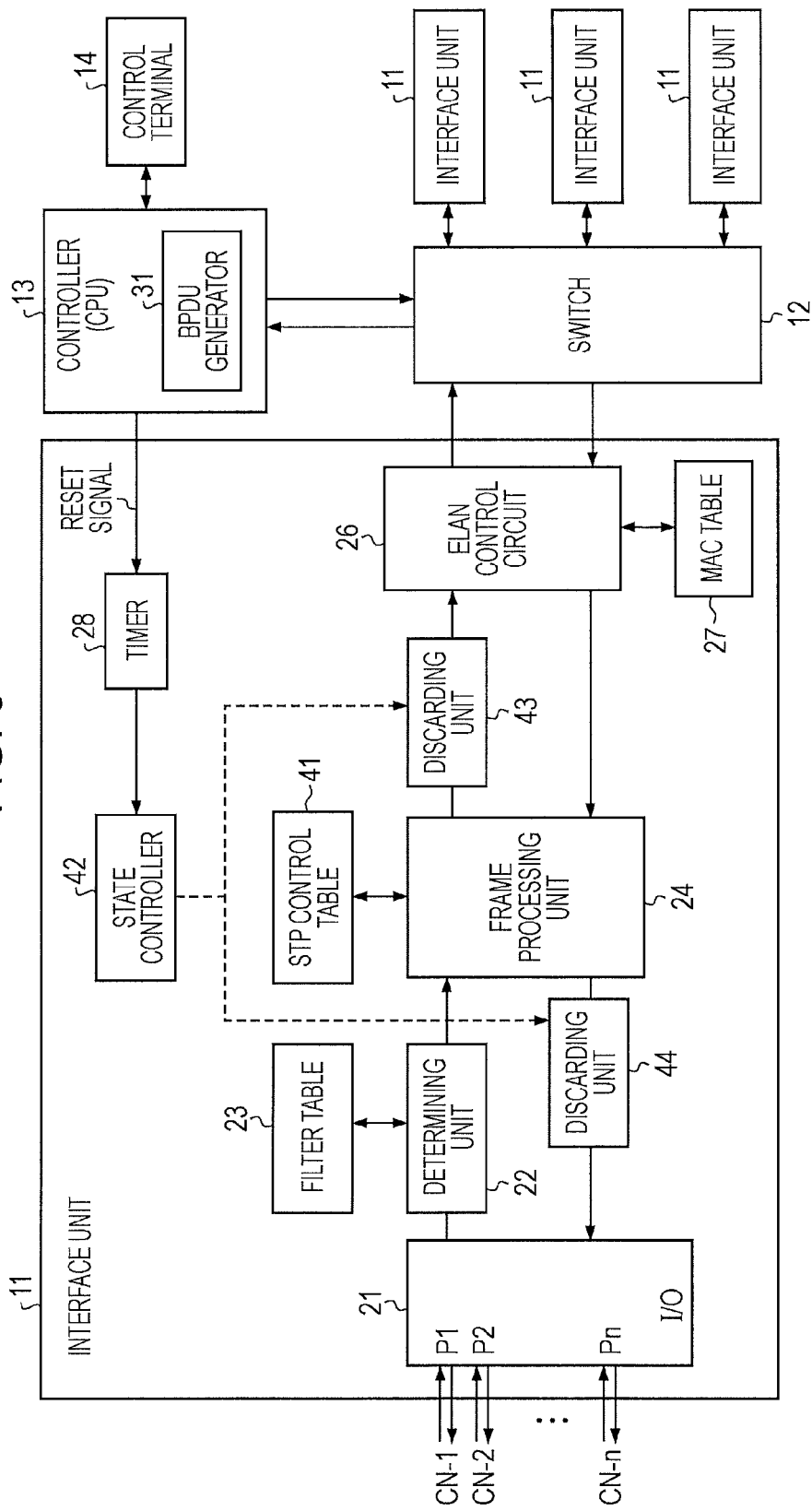
FIG. 9 is a diagram illustrating a configuration example of a communication device, according to a second embodiment.

FIG. 9 illustrates an example of a configuration of a communication device, according to a second embodiment. The second embodiment is different in configurations and operations of interface units 11 from the first embodiment.

The interface units 11 according to the second embodiment each include an I/O unit 21, a determining unit 22, a filter table 23, a frame processing unit 24, an STP control table 41, an ELAN control circuit 26, a MAC table 27, a timer 28, a state controller 42, and discarding units 43 and 44. The I/O unit 21, the determining unit 22, the filter table 23, the frame processing unit 24, the ELAN control circuit 26, the MAC table 27 and the timer 28, which are described in the second embodiment, are substantially the same as those described in the first embodiment and a description thereof is omitted here.

FIG. 10 illustrates an example of a configuration of a STP control table, according to a second embodiment. The STP control table 41 stores a port state and a discarding flag in association with each of the ports P1 to Pn. The port state is the same as that described in the first embodiment. Each of the port states is set at one of the forwarding state, the learning state, the listening state, the blocking state, and the disable state, according to the Spanning Tree Protocol. The discarding flag indicates whether or not a frame is to be discarded when the Spanning Tree Protocol is not normally executed by the controller 13. In this example, the forcible frame-discarding is permitted for a port of which the discarding flag indicates "1", and the forcible frame-discarding is not permitted for a port of which the discarding flag indicates "0".

For example, the forcible frame-discarding is not executed for the following ports, that is, the discarding flag indicating "0" is set for each of the following ports.

(1) A port that does not receive a BPDU frame
(2) A port that is connected to an opposing device that is a user terminal A port that does not receive a BPDU frame is not involved in formation of a loop. Thus, even when a user frame is transmitted or received through the port that does not receive a BPDU frame, a broadcast storm does not occur. Software (for example, a handler for the Spanning Tree Protocol) may detect a port that receives a BPDU frame. In other words, the software may detect a port that does not receive a BPDU frame. Thus, the software may set the "discarding flag indicating 0" for the port that does not receive a BPDU frame.

The port that is connected to the opposing device that is the user terminal is not involved in formation of a loop. Thus, even when a user frame is transmitted or received via the port that is connected to the opposing device that is the user terminal, a broadcast storm does not occur. The user or the network administrator may set the "discarding flag indicating 0" for the port that is connected to the opposing device that is the user terminal. Further, the user or the network administrator may set the "discarding flag indicating 0" for an intended port.

The frame processing unit 24 searches the STP control table 41 illustrated in FIG. 10 using port information identifying a port via which a frame is received or a port via which the frame is transmitted. Then, the frame processing unit 24 processes the frame based on a port state obtained by searching the STP control table 41. In addition, the frame processing unit 24 notifies the discarding unit 43 or 44 of a value of the discarding flag obtained by searching the STP control table 41. That is, when the frame processing unit 24 receives a frame via a port, the frame processing unit 24 notifies the discarding unit 43 of the value of the discarding flag corresponding to the frame. When the frame processing unit 24 receives a frame from the switch 12, the frame processing unit 24 notifies the discarding unit 44 of the value of the discarding flag corresponding to the frame.

When the timer 28 expires, the state controller 42 enables the discarding units 43 and 44. When the BPDU generator 31 normally operates, the state controller 42 disables the discarding units 43 and 44. When a normal operation of the BPDU generator 31 is not detected within a specified time period, the state controller 42 enables the discarding units 43 and 44. The "specified time period" is equal to or nearly equal to the specified time interval described in the first embodiment and longer than the intervals at which BPDU frames are generated.

When the discarding units 43 and 44 are enabled by the state controller 42, the discarding units 43 and 44 process frames on the basis of values, notified by the frame processing unit 24, of discarding flags. For example, when the discarding units 43 and 44 are enabled by the state controller 42, the discarding units 43 and 44 discard frames for which the discarding flags are set at "1". A frame for which the discarding flag is set at "0" is not discarded by the discarding units 43 and 44 and is transferred to a destination port. When the discarding units 43 and 44 are not enabled by the state controller 42, a frame is not discarded regardless of the current value of the discarding flag.

In the second embodiment, when the controller 13 does not normally operate (or the Spanning Tree Protocol is not normally executed), the user or the network administrator may discard a frame of an intended port. In this case, the state of a port of the Spanning Tree Protocol is not updated. Thus, in the second embodiment, the number of paths through which a user frame is not transmitted and received is reduced, compared with the first embodiment. In the second embodiment, whether or not the forcible frame-discarding is permitted may be determined for each of users, for each of virtual LANs, and for each of service flows.

Third Embodiment

In the first and second embodiment, the state of the controller 13 (or the Spanning Tree Protocol) is monitored using reset signals periodically generated by the BPDU generator 31. In the third embodiment, the state of the controller 13 (or the Spanning Tree Protocol) is monitored by another method.

Figure 11:
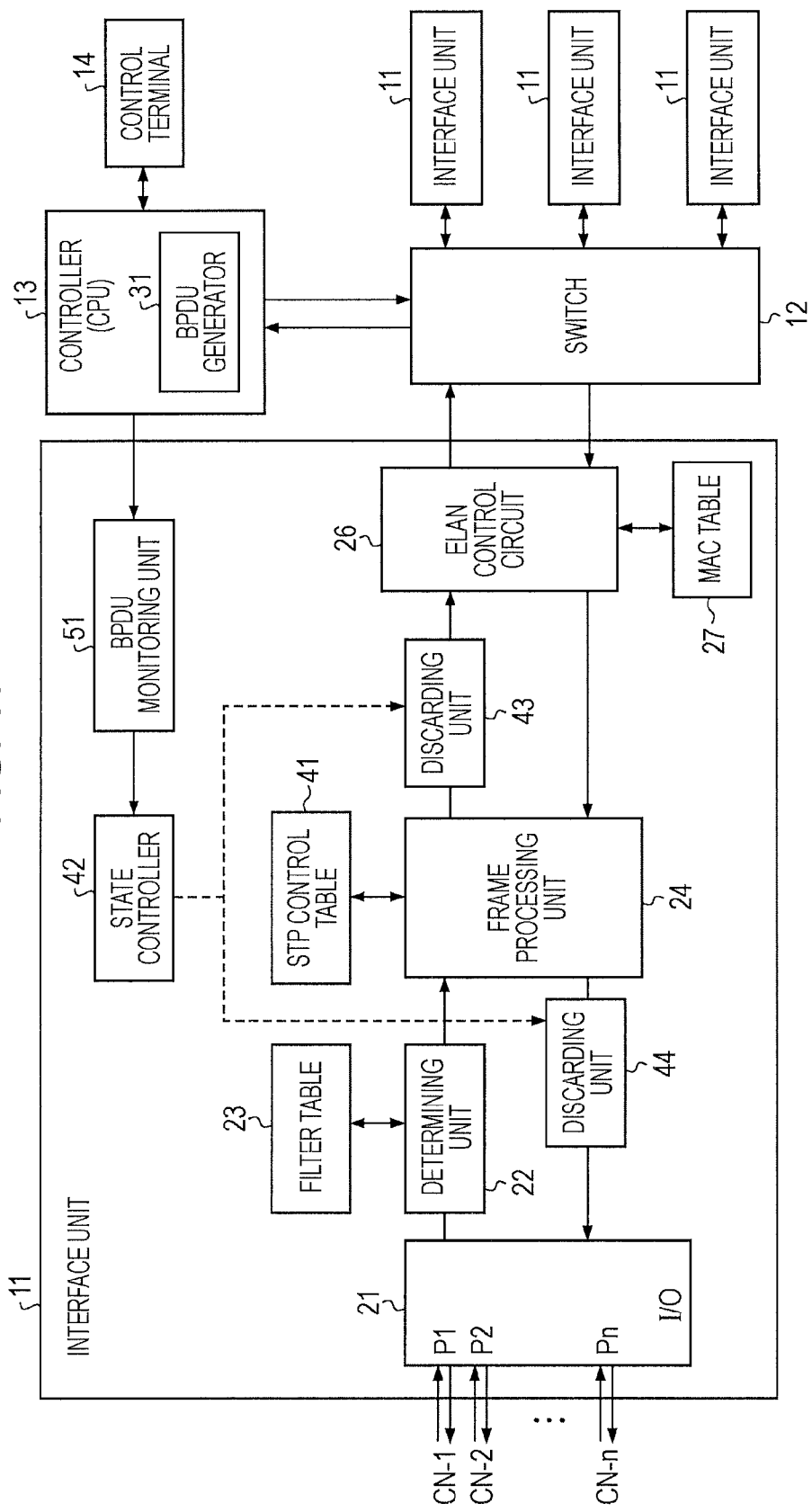
FIG. 11 is a diagram illustrating a configuration example of a communication device, according to a third embodiment.

FIG. 11 illustrates an example of a configuration of a communication device, according to a third embodiment. The interface units 11 of the communication device according to the third embodiment each include a BPDU monitoring unit 51 instead of the timer 28 illustrated in FIG. 6 or 9. In the third embodiment, it is unnecessary for the BPDU generator 31 (or the controller 13) to generate a reset signal.

The BPDU monitoring unit 51 monitors a BPDU frame generated by the BPDU generator 31. When the Spanning Tree Protocol is normally executed by the controller 13, the BPDU generator 31 periodically generates a BPDU frame (at intervals of, for example, 2 seconds), as described above. Thus, when the BPDU monitoring unit 51 does not detect generation or output of a BPDU frame for a specified time period, the BPDU monitoring unit 51 determines that the controller 13 does not normally operate (or the Spanning Tree Protocol is not normally executed). The time period in which the BPDU monitoring unit 51 monitors a BPDU frame is longer than the intervals at which a BPDU frame is generated and is, for example, 6 seconds.

When the BPDU monitoring unit 51 detects that the controller 13 does not normally operate (or the Spanning Tree Protocol is not normally executed), the state monitoring unit 42 enables the discarding units 43 and 44. Operations of the discarding units 43 and 44 are substantially the same as those described in the second embodiment.

In the third embodiment, the state of the controller 13 (or the Spanning Tree Protocol) is determined by monitoring generation or output of a BPDU frame without use of a reset signal. In the example illustrated in FIG. 11, the configuration in which the state of the controller 13 is monitored by the BPDU monitoring unit 51 is applied to the second embodiment. The configuration is not limited to this. For example, the configuration in which the state of the controller 13 is monitored by the BPDU monitoring unit 51 may be applied to the first embodiment.

Fourth Embodiment

Figure 12:
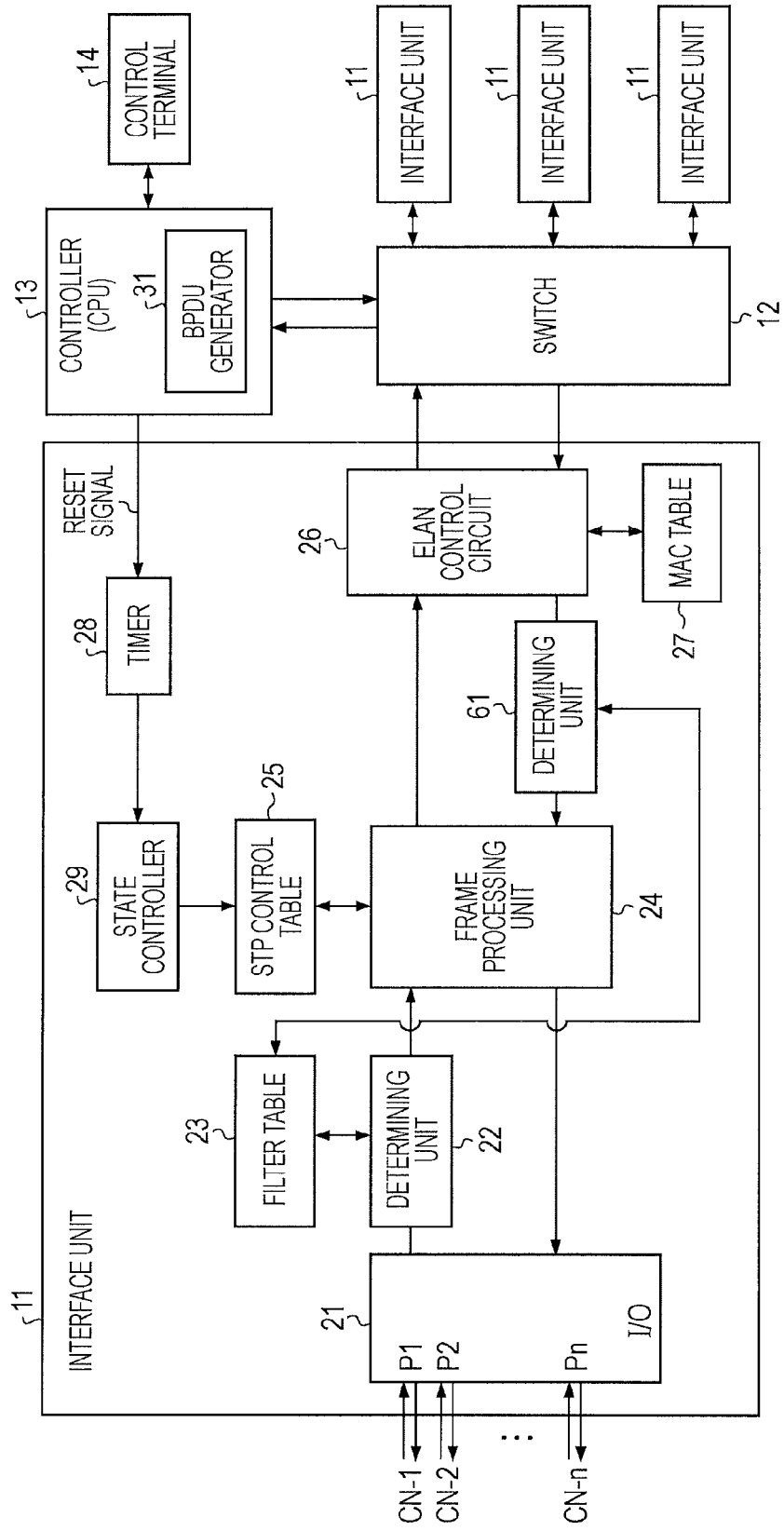
FIG. 12 is a diagram illustrating a configuration example of a communication device, according to a fourth embodiment.

FIG. 12 illustrates an example of a configuration of a communication device, according to a fourth embodiment. The configuration (illustrated in FIG. 12) of the communication device according to the fourth embodiment is the same as the configuration of the first embodiment illustrated in FIG. 6 except for interface units 11. The interface units 11 according to the fourth embodiment each further include a determining unit 61, compared with the first embodiment.

The determining unit 22 searches the filter table 23 using search key information of frames received via the ports P1 to Pn and determines whether or not the Spanning Tree Protocol is applied to the frames, as described above. The search key information is represented by a combination of control information (for example, destination MAC addresses and source MAC addresses) stored in predetermined regions of the received frames and port information identifying the ports via which the frames have been received.

Meanwhile, the determining unit 61 searches the filter table 23 using search key information of to-be-transmitted frames that are forwarded from the switch 12 toward the ports P1 to Pn and determines whether or not the Spanning Tree Protocol is applied to the to-be-transmitted frames. The search key information that is used by the determining unit 61 is represented by a combination of control information (for example, destination MAC addresses and source MAC addresses) stored in predetermined regions of the to-be-transmitted frames and port information identifying the ports to which the to-be-transmitted frames to be guided. The port information is acquired by causing the ELAN control circuit 26 to reference the MAC table 27.

The frame processing unit 24 processes a to-be-transmitted frame to which the Spanning Tree Protocol is applied on the basis of port states set in the STP control table 25. Operations for processing the to-be-transmitted frame on the basis of the port states is substantially the same as those of the first embodiment.

In the fourth embodiment, whether or not the Spanning Tree Protocol is applied is determined using the filter table 23 for not only frames received via the ports P1 to Pn but also frames to be transmitted via the ports P1 to Pn. Thus, whether or not the forcible frame-discarding is permitted may be determined for the received frames and the to-be transmitted frames for each of users, for each of virtual LANs, and for each of service flows.

FIG. 12 illustrates an example of a configuration in which the determining units 61 are added to the communication device according to the first embodiment. The configuration, however, is not limited to this. For example, the determining units 61 may be added to the communication device (illustrated in FIG. 9) according to the second embodiment or the communication device (illustrated in FIG. 11) according to the third embodiment.

Variations

The circuits of the interface units 11 may be implemented by LSI devices, field programmable gate arrays (FPGAs), network processing units (NPUs) or the like.

The interface units 11 may be implemented as interface cards, interface modules, or network adapters.

The embodiments are not limited to the communication devices in which the Spanning Tree Protocol is implemented. The embodiments may be applied to communication devices that use monitoring frames to monitor a connection state of a network in order to avoid a loop on a network. Thus, the BPDU frames are an example of monitoring frames that are used to monitor a connection state of the network. The BPDU generator 31 is an example of a monitoring frame generator that periodically generates monitoring frames. The STP control table 25 is an example of a memory that stores states of the ports.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for performing loop-free transmission in a communication network, the apparatus comprising:
   a plurality of ports;
   a controller including a first processor configured to generate monitoring frames that are transmitted to another apparatus, so as to monitor a connection state of the communication network;
   a memory configured to include port-state information that stores a port state in association with each of the plurality of ports; and
   an interface card including a second processor configured:
      to process a frame based on the port-state information,
      to set, in the port-state information, a stopped state to a first port included in the plurality of ports, in accordance with a time period during which the monitoring frames are not generated and transmitted, and
      to discard a first frame received via the first port for which the stopped state is set in the port-state information and discard an opposing frame destined for an opposing device, wherein
   the memory is further configured to include filter information that stores information indicating whether or not the STP is valid for a received frame, in association with a combination of control information and port-identification information identifying each of the plurality of ports, the control information identifying information stored in a predetermined region of the received frame;
   the second processor of the interface card determines whether or not a spanning tree protocol (STP) is applied to the first frame, by searching the filter information for the combination of the control information coinciding with information stored in the predetermined region of the received first frame and the port-identification information identifying the first port; and
   when it is determined that the STP is applied to the first frame, the second processor of the interface card discards the first frame received via the first port for which the stopped state is set in the port-state information.

2. The apparatus of claim 1, wherein
   the second processor of the interface card discards a second frame that is to be transferred to the first port for which the stopped state is set in the port-state information.

3. The apparatus of claim 1, wherein
   the interface card further includes a timer that measures a predetermined time period;
   when the first processor of the controller periodically generates monitoring frames, the first processor of the controller resets the timer at an interval shorter than the predetermined time period; and
   the second processor of the interface card sets the stopped state to the first port in the port-state information when the timer expires.

4. The apparatus of claim 1, wherein
the second processor of the interface card monitors the monitoring frames generated by the controller; and
the second processor of the interface card sets the stopped state to the first port in the port-state information when the monitoring frames are not generated by the controller for a predetermined time period.

5. An apparatus for performing loop-free transmission in a communication network, the apparatus comprising:
a plurality of ports;
a controller including a first processor configured to generate monitoring frames that are transmitted to another apparatus, so as to monitor a connection state of the communication network;
a memory configured to include discard-control information that stores information indicating whether or not a discarding process for discarding a frame is valid, in association with each of the plurality of ports;
an interface card including a second processor configured:
to perform the discard process that discards a first frame received via a first port for which the discard-control information stores information indicating that the discard process is valid and discard an opposing frame destined for an opposing device, and
to control the discard process so that the discard process is disabled for a time period during which the monitoring frames are generated by the controller and enabled for a time period during which the monitoring frames are not generated and transmitted by the controller, wherein
the memory is further configured to include filter information that stores information indicating whether or not the STP is valid for a received frame, in association with a combination of control information and port-identification information identifying each of the plurality of ports, the control information identifying information stored in a predetermined region of the received frame:
the second processor of the interface card determines whether or not a spanning tree protocol (STP) is applied to the first frame, by searching the filter information for the combination of the control information coinciding with information stored in the predetermined region of the first frame and the port-identification information identifying the first port; and
when it is determined that the STP is applied to the first frame, the second processor of the interface card discards the first frame received via the first port for which the discard-control information stores information indicating that the discard process is valid.

6. The apparatus of claim 5, wherein the second processor of the interface card discards a second frame that is to be transferred to the first port for which the discard-control information stores information indicating that the discard process is valid.

7. The apparatus of claim 5, wherein the interface card further includes a timer that measures a predetermined time period;
when the first processor of the controller periodically generates monitoring frames, the first processor of the controller resets the timer at an interval shorter than the predetermined time period; and
the second processor of the interface card enables the discard process when the timer expires.

8. The apparatus of claim 5, wherein
the second processor of the interface card monitors the monitoring frames generated by the controller; and
the second processor of the interface card enables the discard process when the monitoring frames are not generated by the controller for a predetermined time period.

* * * * *